(No Model.)
G. H. CORLISS.
PUMP.
No. 276,003.  Patented Apr. 17, 1883.
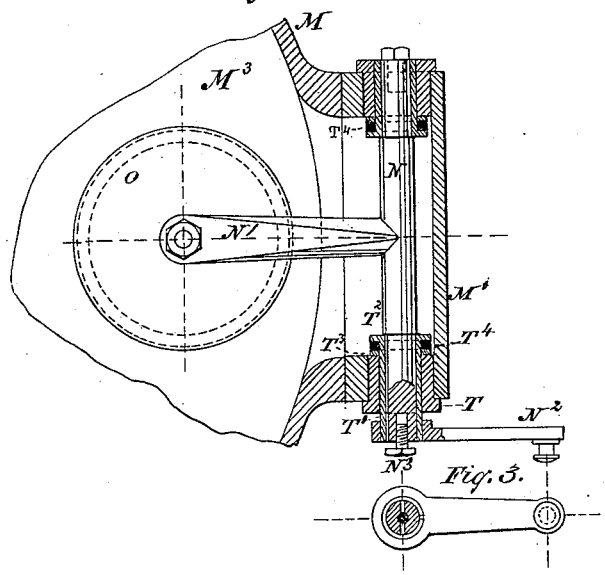
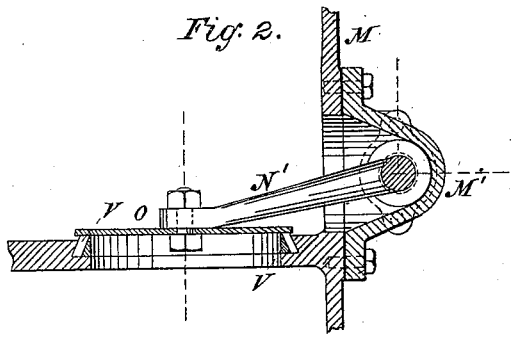
Witnesses.
W. Colborne Brookes
Charles C. Stetson
Inventor.
George H. Corliss.
by his attorney C. C. Stetson.

UNITED STATES PATENT OFFICE.

GEORGE H. CORLISS, OF PROVIDENCE, RHODE ISLAND.

PUMP.

SPECIFICATION forming part of Letters Patent No. 276,003, dated April 17, 1883.

Application filed June 14, 1880. Renewed September 11, 1882. (No model.)

*To all whom it may concern:*

Be it known that I, GEORGE H. CORLISS, of Providence, in the county of Providence, in the State of Rhode Island, have invented certain new and useful Improvements relating to Pumps, of which the following is a specification.

It applies to pumps in which one or more of the valves are mounted on arms from a shaft or shafts which extend out through the shell of the pump, and which require some provision for preventing the leakage of the water around the shaft, and also for allowing the parts to be inserted and removed. I attach the parts to a bonnet, which may be removed with the shaft and valve.

The invention relates to means for inserting and removing and insuring the light and easy operating of the shaft. A description of one will suffice for both or all. The bonnet is hollow, and projects sufficiently outside of its seat to allow the shaft and its peculiar bearings to be within the bonnet. Only the arm carrying the valve extends inward past the seat of the bonnet.

The invention is intended more especially for large pumps, such as are used for pumping the water-supply for towns; but it may be of much advantage on smaller pumps.

The accompanying drawings form a part of this specification, and represent what I consider the best means of carrying out the invention.

Figure 1 is a horizontal section of a pump provided with my invention. The section is in the plane of the valve-shaft. Fig. 2 is a vertical section in the plane of the center of the valve, and Fig. 3 represents a detail detached.

Similar letters of reference indicate like parts in all the figures where they occur.

M is a rigid exterior casing adapted to resist high pressure, and is provided at suitable intervals with opening and removable bonnets M', screwed or otherwise fitted over them.

The bearing at each end of the shaft is covered by a sleeve peculiarly adapted to make a water-tight and easily-moving bearing. Exterior to this sleeve is a bushing, T. The hole in the bonnet to receive bushing T is so large that before the bushing is received the shaft may be easily introduced. It is inserted diagonally and rectified in its position after insertion, as will be readily understood. The bushings T are inserted from the exterior after the shaft and its levers are in place.

T' are sleeves, shrunk or otherwise firmly fitted on the respective ends of the shaft N. They, as also the bushings T, are of brass or other incorrodible metal. The turning motion is between the sleeve T' and the bushing T. The inner end of each sleeve T' is formed with a flange, $T^2$. Next to this I apply a ring, $T^4$, of vulcanized rubber. Next to this, again, I fit a loose collar, $T^3$. The outer face of this collar is finished smoothly. So is also the adjacent surface of the bushing T, against which it is pressed. The packing $T^4$ being gently compressed, the faces are worked tightly together, so as to make a water-tight joint.

The valve O is provided on its under side with the flexible rim V, and it serves in connection with an opening in the stout diaphragm $M^3$, inside of the casing M. The valve is adapted to serve as a hinge-valve, turning with its connecting-arm N' on the shaft N as a center.

Before applying the parts together the sleeves T', packing $T^4$, and movable collars $T^3$ are applied in their proper positions on the shaft, and the bushing T not being yet in place the shaft N is easily inserted, the longest end being, of course, inserted first. Then the bushes T are applied from the outer ends and urged home to form a tight joint between the rubbing surfaces. The lever $N^2$ is applied after the other parts are in place. It is secured by expanding the end of the shaft N by the tapering screw $N^3$. The end of the shaft N is split, as is also the outer end of the sleeve T', to allow their expansion in this manner. They may be expanded so as to take hold of the arm $N^2$ with sufficient force by friction alone; but a key or similar fastening may be used in addition, if preferred. Each end of the shaft N is made of equal area, and both ends are purposely left exposed, so as to secure an equilibrium as regards internal hydrostatic pressure. This prevents wear upon the movable collars $T^3$ and the bushing T. The lever $N^2$, being outside of the casing and rigidly connected to the shaft N, serves not only to aid in opening and closing the valve O by force applied thereto through this lever, but also as a means of indicating to the eye the position of the valve under all circumstances. The mounting of the shaft N and its attachments on the removable bonnet M' makes it easy to remove the valve for examination and repairs without breaking the joints around the shaft.

Modifications may be made in the form and proportions by any good mechanic without sacrificing the advantages of the invention.

I do not in this patent claim the valve, shaft, and arms which allow the application of mechanism to aid the prompt closing of the valve, such being made the subject of a separate application for patent.

I claim as my invention—

1. The sleeve T' T², flanged as shown, the packing-ring T⁴, and movable collar T³, in combination with the bushing T, and with a shaft, N, having the arms N' N², and attached valve O, as herein specified.

2. The valve O, split shaft N, and split sleeve T', in combination with each other, and with the taper screw N³ and arm N², and all arranged to serve as herein specified.

3. In combination with the rigid casing M, adapted to resist a high pressure, the hinge-valve O, rocking shaft N, arm N², and means, substantially as shown, for forming a tight joint around the shaft N, all mounted on a removable bonnet, M', and adapted to serve as herein specified.

In testimony whereof I have hereunto set my hand, at Providence, Rhode Island, this 9th day of June, 1880, in the presence of two subscribing witnesses.

GEO. H. CORLISS.

Witnesses:
 EDGAR PENNEY,
 ED. W. RAYNSFORD.